United States Patent [19]

Andres et al.

[11] 4,213,581

[45] Jul. 22, 1980

[54] WIND-UP MECHANISM FOR THE ELIMINATION OF BELT LOOSENESS IN A SAFETY BELT SYSTEM

[75] Inventors: Rudolf Andres; Helmut Grantz; Günter Abersfelder, all of Sindelfingen; Gerhard Busch, Gechingen, all of Fed. Rep. of Germany

[73] Assignee: Daimler-Benz Aktiengesellschaft, Fed. Rep. of Germany

[21] Appl. No.: 8,571

[22] Filed: Feb. 1, 1979

[30] Foreign Application Priority Data

Feb. 9, 1978 [DE] Fed. Rep. of Germany ....... 2805381

[51] Int. Cl.² ................... A62B 35/00; B65H 75/48
[52] U.S. Cl. ................... 242/107.4 R; 280/807
[58] Field of Search ............... 242/107.4 R–E, 242/107; 297/388; 280/801–808

[56] References Cited

U.S. PATENT DOCUMENTS

| 3,767,135 | 7/1971 | Booth | 242/107.4 D |
| 4,142,692 | 3/1979 | Andres | 242/107.4 R |
| 4,151,967 | 5/1979 | Lindblad | 242/107.4 R |

*Primary Examiner*—John M. Jillions
*Attorney, Agent, or Firm*—Craig & Antonelli

[57] ABSTRACT

A wind-up mechanism for eliminating the belt looseness of a safety belt system when exceeding a predetermined deceleration, in which an ignitable propellant charge, provided for triggering the retraction movement of the belt is arranged centrally in the hollow shaft of a belt roller that blocks automatically in case of danger. A liquid medium is preferably disposed in front of the propellant charge which, after the ignition of the propellant charge, drives a rotor coupled at that instant with the wind-up roller so as to eliminate the belt looseness by the gases forming during the ignition of the propellant charge. The hollow shaft accommodates at one end a cap and a toothed rim connected therewith, into which engages a blocking mechanism triggered in case of danger, while at least a part of the rotor is formed-on at the other end of the shaft in the course of a cold-flow or casting operation.

35 Claims, 6 Drawing Figures

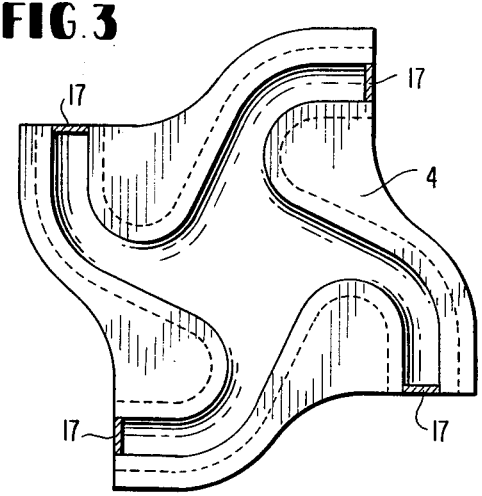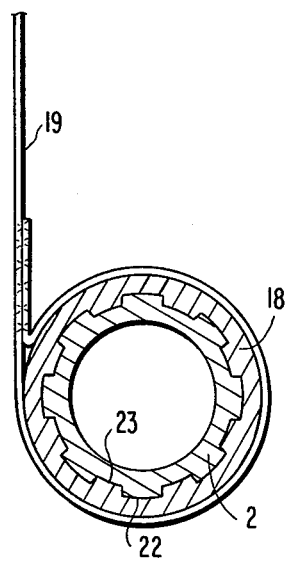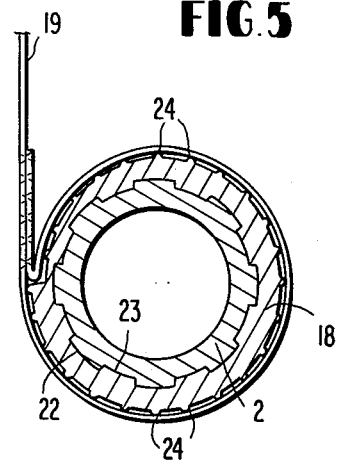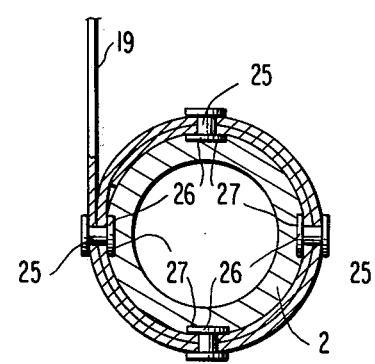

WIND-UP MECHANISM FOR THE ELIMINATION OF BELT LOOSENESS IN A SAFETY BELT SYSTEM

The present invention relates to a wind-up mechanism for eliminating the belt looseness of a safety belt system when exceeding a predetermined vehicle deceleration, whereby for purposes of triggering the retraction movement, a preferably electrically ignitable propellant charge, arranged in the axial direction of the wind-up roller, is provided and the propellant charge is arranged concentrically in the extension of the hollow shaft of a belt roller automatically blocking in case of danger. The shaft receives a continuously effective retraction device as well as the wind-up roller, and whereby a fluid medium is disposed ahead of the propellant charge which, after the ignition of the propellant charge, drives a wheel or rotor coupled at that instant with the wind-up roller so as to eliminate of the belt looseness by the thus-forming gases, as disclosed in the German patent application P 26 25 573.2, corresponding to the U.S. application Ser. No. 803,385, now U.S. Pat. No. 4,142,692 and assigned to the assignee of the instant application, the subject matter of which is incorporated herein by reference to the extent necessary.

It is the aim of the present invention to improve the wind-up mechanism described hereinabove so that, in addition to an increase of the operating safety, the construction of the device and therewith the assembly and service thereof can be kept simplified.

Accordingly, a wind-up mechanism of the type disclosed in the aforementioned German patent application is proposed, whereby according to the present invention the shaft receives a cap at one end with a toothed rim being directly or indirectly connected with this cap, into which toothed rim a locking mechanism engages triggered in case of danger by, for example, a pendulum—which prevents a further pulling out of the belt—and in that at least a part of the rotor or wheel is formed-on at the other end of the shaft by a cold deformation or casting operation.

By reason of the support of the locking mechanism at the cap, it is possible to thereby relieve the rotor and so it can be designed simpler and smaller as regards its rigidity and construction. Furthermore, a structural unit can be produced consisting of the shaft, the formed-on rotor and a return spring secured on the shaft, which in the course of the assembly operation can be readily supported and completed in the housing.

In a preferred embodiment of the present invention, the cap includes the propellant charge within an inwardly disposed, cup-shaped recess closed off by a cover constructed as piston, which propellant charge rotates along during rotary movements of the shaft and is adapted to be ignited by an external coil arrangement.

However, it is also possible that the cap serves as covering of the propellant charge which is retained sealed off against the outside in a non-rotatable fixed mounting means fixed relative to the housing, whereby the propellant charge has a spacing with respect to the surrounding walls of the shaft and of the cap and whereby a piston is arranged as directly in front of the propellant charge as possible in the direction of the gases produced in the case of a triggering.

As a result of the coordination according to the present invention of the cap and of the piston in the two aforementioned embodiments, a particularly good damming-up of the propellant charge and therewith in case of triggering, a substantially delay-free response of the installation is achieved.

According to a further feature of the present invention, the piston sealed with respect to the shaft is bent-off approximately disk-shaped away from the propellant charge, as a result of which a recess is created which accommodates a compressible medium. The compressible medium can be separated with respect to the liquid medium by a diaphragm assuming in its edge area the sealing of the piston. One achieves therewith a cushion effect during the ignition of the propellant charge, whereby a particularly tight abutment of the piston is achieved by the drawn-up piston edges.

According to a further feature of the present invention, the shaft includes in its center area an external toothed arrangement which is in meshing engagement with a coordinated toothed arrangement of the installed wind-up roller, on which the belt band is fixed or secured by gluing, by a frictional connection or by a form-locking connection, for example, in the form of rivets.

However, it is also of advantage to secure the belt band directly on the shaft by gluing, frictional connection or form-locking connection.

A good utilization of the resulting fluid stream is achieved if the rotor is acted upon from the inside toward the outside and if the fluid medium flows off tangentially.

It will provide manufacturing advantages if the rotor is subdivided transversely to its axis of rotation and is completed by a correspondingly constructed cover which, for example, is welded on.

Accordingly, it is an object of the present invention to provide a wind-up mechanism for the elimination of belt looseness of a safety system, which avoids the aforementioned shortcomings and drawbacks encountered in the prior art by extremely simple and operationally reliable means.

Another object of the present invention resides in a wind-up mechanism for eliminating the belt looseness of a safety belt system of a motor vehicle which not only increases the operating reliability and safety but additionally renders more simple the assembly and servicing thereof.

A further object of the present invention resides in a wind-up mechanism of the type described above, in which at least some of the parts can be made simpler and smaller without jeopardizing proper operation of the device.

Still another object of the present invention resides in a wind-up mechanism for eliminating the belt looseness of a safety belt system as used in motor vehicles, which permits a preassembly of certain parts thereof that can be readily assembled and completed within the housing of the device.

Another object of the present invention resides in a wind-up mechanism for eliminating the belt looseness of a safety belt system which provides excellent response characteristics in case of danger.

These and further objects, features and advantages of the present invention will become more apparent from the following description when taken in connection with the accompanying drawing which shows, for purposes of illustration only, several embodiments in accordance with the present invention, and wherein:

FIG. 3 is an end elevational view of the cover of a two-part rotor as viewed in the direction of the arrows III—III of FIG. 1; and FIGS. 4 to 6 are cross-sectional views illustrating different possibilities of fixing the belt band in a wind-up mechanism according to the present invention.

Figure 1:
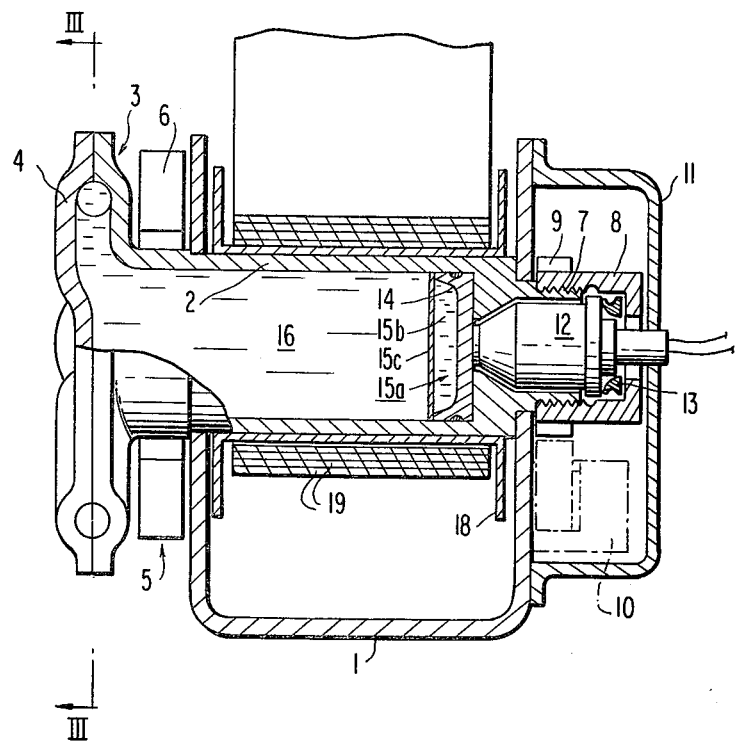
FIG. 1 is a somewhat schematic view, partly in cross section, of a wind-up mechanism in accordance with the present invention provided with a fixed propellant charge.
Figure 2:
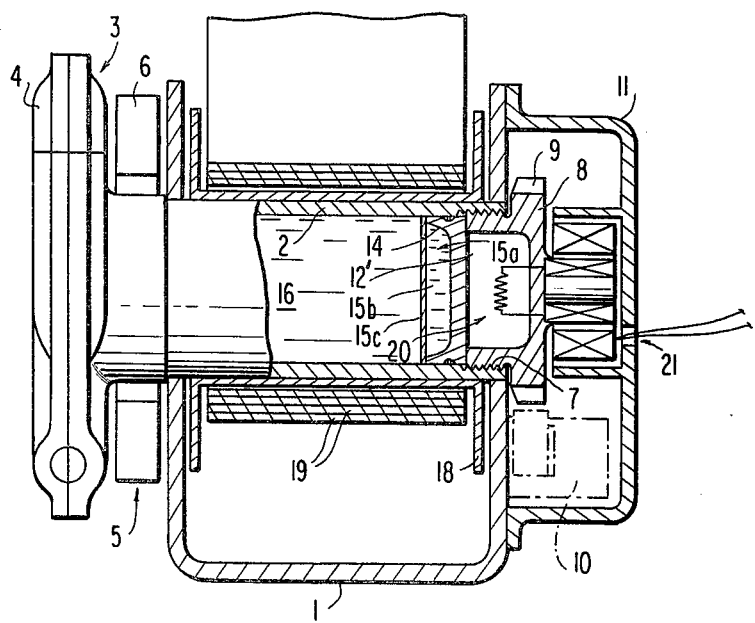
FIG. 2 is a partial cross-sectional view, similar to FIG. 1, of a modified embodiment of a wind-up mechanism in accordance with the present invention provided with a rotating propellant charge.

Referring now to the drawing wherein like reference numerals are used throughout the various views to designate like parts, according to FIGS. 1 and 2, the wind-up mechanism essentially consists of a hollow shaft 2 rotatably supported in a relatively fixed housing 1 fixed with respect to the vehicle, whereby a part of a rotor generally designated by reference numeral 3 is formed-on at one end of the shaft 2, which rotor is completed by a correspondingly constructed cover 4 (FIG. 3) which is, for example, welded to the rotor part 3. The shaft 2 further receives a continuously effective retraction mechanism generally designated by reference numeral 5 in the form of a spiral spring 6 and is provided at its other end with a thread 7 for the mounting of a cap 8. The cap 8 includes a toothed rim 9, into which engages in case of danger, a blocking mechanism 10 only schematically indicated—which prevents a further belt pull-out. The cap 8 serves additionally as external covering for a fixed propellant charge 12 non-rotatably held in a mounting support 11 fixed at the housing, whereby the propellant charge 12 has a spacing on all sides thereof with respect to the surrounding walls and is closed off against the outside by a seal 13, and whereby the sealing effect is still further enhanced in case of triggering of the propellant charge 12 by the reaction force which will occur at that time.

A piston 14 is disposed as directly as possible in front of the propellant charge 12, which piston is bent away from the propellant charge 12 approximately dish-shaped so that a recess generally designated by the reference numeral 15a results which is filled with a compressible medium 15b. If one utilizes as compressible medium 15b a gaseous material or a material absorbing liquid, then one provides a diaphragm 15c which can be utilized in its edge area for sealing the piston 14 and which separates the compressible medium 15b from the liquid medium 16. The latter fills the remaining space up to the discharge openings of the rotor 3 which are closed off by plugs 17 (FIG. 3).

In a manner not illustrated in detail herein, the shaft 2 receives a glued-on wind-up roller 18 for the belt band 19 which in its turn can be glued onto the wind-up roller 18.

In the embodiment according to FIG. 2, a propellant charge 12' is accommodated by a recess generally designated by the reference numeral 20 in the cap 8 and thus partakes in the rotary movements of the shaft 2. The ignition pulse for triggering the propellant charge 12' takes place inductively by a coil arrangement generally designated by the reference numeral 21 having at least one fixed winding and one winding partaking in the rotary movements of the shaft 2.

As shown in FIGS. 4 and 5, the shaft 2 may be provided with an externally toothed arrangement 22 for mounting the wind-up roller 18 on the shaft 2, into which engages a correspondingly toothed arrangement 23 of the wind-up roller 18. The belt band 19 can then be glued onto the wind-up roller 18 according to FIG. 4 or according to FIG. 5 can also be fixed by a frictional connection which is produced by the teeth 24.

In the embodiment according to FIG. 6, the belt band 19 is secured by means of rivets 25 whose rivet heads 26 engage in corresponding recesses 27 of the shaft 2.

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A wind-up mechanism for eliminating belt looseness of a safety belt system upon exceeding a predetermined vehicle deceleration, the wind-up mechanism comprising a wind-up roller means, a hollow shaft means, a rotor means coupled with the wind-up roller means, a retraction means coupled with said hollow shaft means for normally urging the wind-up roller means in a belt retraction direction, said wind-up roller means being mounted on said shaft means, and an ignitable propellant charge means arranged in the hollow shaft means for triggering a retraction movement of the wind-up roller means, a fluid medium disposed in front of the propellant charge means which, after the ignition of the propellant charge means, drives the rotor means so as to eliminate a looseness of the belt, characterized in that a cap means is mounted at one end of the hollow shaft means, a toothed rim is connected with the cap means, blocking means are provided for preventing a further belt pull-out by an engagement between the toothed rim and said blocking means, at least part of the roller means is formed-on the hollow shaft means at an end opposite the cap means, the cap means includes an inwardly disposed cup-shaped recess means for accommodating the propellant charge means, a piston means for closing off said recess means and for displacing the fluid medium upon an ignition of the propellant charge means, said cap means and said propellant charge means rotate along during a rotary movement of the hollow shaft means, and in that said propellant charge means is ignitable by an external coil arrangement.

2. A wind-up mechanism for eliminating a belt looseness of a safety belt system upon exceeding a predetermined vehicle deceleration, the wind-up mechanism comprising a wind-up roller means, a hollow shaft means, a rotor means coupled with the wind-up roller means, a retraction means coupled with said hollow shaft means for normally urging the wind-up roller means in a belt retraction direction, said wind-up roller means being mounted on said hollow shaft means, and an ignitable propellant charge means arranged in the hollow shaft means for triggering a retraction movement of the wind-up roller means, a fluid medium disposed in front of the propellant charge means which, after ignition of the propellant charge means, drives the rotor means so as to eliminate a looseness of the belt, characterized in that a cap means is mounted at one end of the hollow shaft means, a toothed rim is connected with the cap means, blocking means are provided for preventing a further belt pull-out by an engagement between said toothed rim and said blocking means, at least a part of the rotor means is formed-on the hollow shaft means at an end opposite the cap means, the cap means serves as a cover means for the propellant charge means, means are provided for holding the propellant charge means in a relatively fixed, non-rotatable manner, means are provided for sealing the propellant charge means against the outside, said holding means holds the propellant charge means so that a spacing is provided on all sides thereof with respect to the surrounding walls of the hollow shaft means and the cap means, and in that a piston means is disposed substantially directly in front of the propellant charge means in a direction of the gases resulting in case of a triggering of the propellant charge means.

3. A wind-up mechanism according to one of claims 1 or 2 characterized in that the retraction means is continuously effective.

4. A wind-up mechanism according to one of claims 1 or 2 characterized in that the toothed rim is directly connected with the cap means.

5. A wind-up mechanism according to one of claims 1 or 2 characterized in that the toothed rim is indirectly connected with the cap means.

6. A wind-up mechanism according to one of claims 1 or 2, characterized in that the blocking means is operable to be triggered by a pendulum.

7. A wind-up mechanism according to one of claims 1 or 2, characterized in that the part of the rotor means is formed-on the end of the shaft means by a cold deformation operation.

8. A wind-up mechanism according to one of claims 1 or 2, characterized in that the part of the rotor means is formed-on the of the shaft means by a casting operation.

9. A wind-up mechanism according to one of claims 1 or 2, characterized in that the propellant charge means is electrically ignitable.

10. A wind-up mechanism according to one of claims 1 or 2, characterized in that means are provided for sealing the piston means with respect to the hollow shaft means, the piston means is approximately dish-shaped on a side facing away from the propellant charge means so as to form a recess which accommodates a compressible medium.

11. A wind-up mechanism according to claim 10, characterized in that a diaphragm means separates the compressible medium with respect to the fluid medium with an edge area of the diaphragm means forming the means for sealing the piston means with respect to the hollow shaft means.

12. A wind-up mechanism according to claim 11, characterized in that an externally toothed means is provided within a center area of the hollow shaft means for engagement with a coordinated toothed means of an installed wind-up rotor means, and in that the safety belt system includes a belt band fixed on the wind-up roller means.

13. A wind-up mechanism according to claim 12, characterized in that the belt band is fixed on the wind-up roller means by bonding.

14. A wind-up mechanism according to claim 12, characterized in that the belt band is fixed on the wind-up roller means by rivets.

15. A wind-up mechanism according to claim 12, characterized in that the belt band is fixed on the wind-up roller means by a frictional connection means.

16. A wind-up mechanism according to claim 12, characterized in that the belt band is fixed on the wind-up roller means by a form-blocking connection means.

17. A wind-up mechanism according to claim 11, characterized in that the hollow belt band is secured directly on the shaft means.

18. A wind-up mechanism according to claim 17, characterized in that the belt band is directly secured on the hollow shaft means by bonding.

19. A wind-up mechanism according to claim 17, characterized in that the belt band is fixed on the wind-up roller means by a frictional connection means.

20. A wind-up mechanism according to claim 17, characterized in that the belt band is fixed on the wind-up roller means by a form-blocking connection means.

21. A wind-up mechanism according to claim 11, characterized in that the rotor means is acted upon from the inside toward the outside and the fluid medium flows off tangentially.

22. A wind-up mechanism according to claim 11, characterized in that the rotor means is subdivided transversely to its axis of rotation and is completed by a correspondingly constructed cover means.

23. A wind-up mechanism according to claim 22, characterized in that the cover means is welded on.

24. A wind-up mechanism according to one of claims 1 or 2, characterized in that an externally toothed means is provided within a center area of the hollow shaft means for engagement with a coordinated toothed means of an installed wind-up roller means, and in that the safety belt system includes a belt band fixed to one of the wind-up roller means and the hollow shaft means.

25. A wind-up mechanism according to claim 24, characterized in that the belt band is fixed on the wind-up roller means by bonding.

26. A wind-up mechanism according to claim 24, characterized in that the belt band is fixed on the wind-up roller means by a frictional connection means.

27. A wind-up mechanism according to claim 24, characterized in that the belt band is fixed on the wind-up roller means by a form-blocking connection means.

28. A wind-up mechanism according to claim 24, characterized in that the belt band is secured directly on the shaft means.

29. A wind-up mechanism according to claim 28, characterized in that the belt band is directly secured on the hollow shaft means by bonding.

30. A wind-up mechanism according to claim 28, characterized in that the belt band is directly received on the hollow shaft means by a frictional connection means.

31. A wind-up mechanism according to claim 28, characterized in that the belt band is directly secured on the hollow shaft means by a form locking connection means.

32. A wind-up mechanism according to one of claims 1 or 2, characterized in that the rotor means is acted upon from the inside toward the outside and the fluid medium flows off tangentially.

33. A wind-up mechanism according to one of claims 1 or 2, characterized in that the rotor means is subdivided transversely to its axis of rotation and is completed by a correspondingly constructed cover means.

34. A wind-up mechanism according to claim 1, characterized in that the inductive means are provided for triggering the propellant charge means.

35. A wind-up mechanism according to claim 34, characterized in that the inductive means includes at least one fixed winding and at least one winding rotatable with the hollow shaft means.

* * * * *